US012681256B2

(12) United States Patent
Tomlinson et al.

(10) Patent No.: US 12,681,256 B2
(45) Date of Patent: Jul. 14, 2026

(54) METHOD AND UNIVERSAL APPARATUS FOR OPTICAL FIBER INSTALLATION

(71) Applicant: JAMESON, LLC, Clover, SC (US)

(72) Inventors: Blake Andrew Tomlinson, Statesville, NC (US); Mark A. Turner, Arlington, TX (US)

(73) Assignee: Jameson, LLC, Clover, SC (US)

( * ) Notice: Subject to any disclaimer, the term of this patent is extended or adjusted under 35 U.S.C. 154(b) by 253 days.

(21) Appl. No.: 18/479,359

(22) Filed: Oct. 2, 2023

(65) Prior Publication Data

US 2025/0110306 A1 Apr. 3, 2025

(51) Int. Cl.
 *G02B 6/54* (2006.01)
 *H02G 1/08* (2006.01)

(52) U.S. Cl.
 CPC .............. *G02B 6/54* (2013.01); *H02G 1/085* (2013.01)

(58) Field of Classification Search
 CPC ... G02B 6/52; G02B 6/54; H02G 1/08; H02G 1/085
 See application file for complete search history.

(56) References Cited

U.S. PATENT DOCUMENTS

| | | | | |
|---|---|---|---|---|
| 5,749,565 A | * | 5/1998 | Frost | G02B 6/50 |
| | | | | 254/134.4 |
| 5,906,140 A | * | 5/1999 | Smith | B62K 23/06 |
| | | | | 74/502.2 |
| 6,386,512 B1 | * | 5/2002 | Pecot | H02G 1/086 |
| | | | | 254/134.4 |
| 2004/0007699 A1 | * | 1/2004 | Griffioen | H02G 1/086 |
| | | | | 254/134.4 |

(Continued)

FOREIGN PATENT DOCUMENTS

| | | | |
|---|---|---|---|
| CH | 711903 A2 | * | 6/2017 |
| CN | 104977688 A | * | 10/2015 |
| WO | WO 2020/106164 A1 | * | 5/2020 |

OTHER PUBLICATIONS

Screen captures from "Plumettaz Ultimaz P2P-V20 user guide", https://www.youtube.com/watch?v=BV75VOLji70 , uploaded Sep. 9, 2021 (38 pages) (Year: 2021).*

(Continued)

*Primary Examiner* — Michael Stahl
(74) *Attorney, Agent, or Firm* — Shumaker, Loop & Kendrick, LLP; S. Alexander Long, Jr.; Brian D. MacDonald

(57) ABSTRACT

A fiber optic installation device is disclosed for easily and efficiently installing fiber into an existing conduit in order to provide telecommunication and other services. The installation device includes a housing having first and second entry points. A first tube is releasably coupled to the first entry point, and configured for receiving a fiber cable, and a second tube is releasably coupled to the second entry point, and configured for receiving and securing an existing conduit so that the fiber optic cable can be pushed through and installed into the conduit. The cable is driven through the device via a drive wheel that is coupled to a drive shaft being driven by a standard electric drill. To prevent slippage of the cable, a pincher wheel is adjusted up or down via a knob to ensure the fiber optic cable remains in contact with the drive wheel throughout the installation process.

23 Claims, 3 Drawing Sheets

100

(56) References Cited

U.S. PATENT DOCUMENTS

2009/0026429 A1 \* 1/2009 Barker .................. H02G 1/086
                                                                254/134.4
2009/0236575 A1 \* 9/2009 Cherix ..................... G02B 6/52
                                                                29/244

OTHER PUBLICATIONS

Ultimaz™ P2P Point-to-Point Fiber Drop Placing System data sheet, dated May 2015, retrieved from https://greenlee-cdn.ebizcdn. com/media/MA6378 Ultimaz P2P Data Sheet.pdf (Year: 2015).\*
Plumett Ultimaz V20 Operating and maintenance manual, version 1.2, dated Jan. 6, 2009, retrieved from https://calvan.se/GetItem Doc?itemNo=H3250000&fileName=Manual.pdf (Year: 2009).\*
Screen captures from "Blowing Fiber with EZ Speedy and EZ Booster into microducts", https://www.youtube.com/watch?v= dBRluc2H_VO, uploaded Dec. 7, 2015 (4 pages) (Year: 2015).\*
Zeitler AG FTTx Cable Blowers brochure—retrieved Sep. 16, 2025 from https://zeitler.swiss/wp-content/uploads/2024/05/EZ.SPEEDY_ Brochure_English_Version-1-2024.pdf (Year: 2025).\*
Jameson Fiber Driver™ With Air Boost™ brochure—retrieved Sep. 16, 2025 from https://s3.us-west-2.amazonaws.com/catsy. 1087/ JAMESON_Fiber-Drop-Installation_18-FFK1_Brochure_PD_2025_ 52.pdf (Year: 2025).\*
Innerduct.com Zinger Tool Owner Manual, retrieved Sep. 16, 2025 from https://cdn.shopify.com/s/files/1/0591/3985/0338/files/Zinger_ Tool_Manual_2024_-_ Innerduct.pdf?v=1725474949 (Year: 2025).\*

\* cited by examiner

100

200

201

202

203

METHOD AND UNIVERSAL APPARATUS FOR OPTICAL FIBER INSTALLATION

TECHNICAL FIELD

The present disclosure generally relates to a universal tool for installing fiber optical cable, and more particularly, to a device for pushing or threading fiber for telecommunication purposes.

BACKGROUND

Optical fiber, also known as fiber optic cable or cabling, is used in a variety of applications, including, but not limited to, telecommunication networks, local area networks (LANs), data centers, cable television systems (CATV), and high-speed Internet connections. Fiber optics transmit data in the form of light particles, or photons. There are several advantages of fiber optics when compared to copper cables, including supporting high bandwidth capacities, less susceptibility to interference such as electromagnetic interference, minimal loss in signals as compared to copper cables, the ability to submerge the fiber optics in water, they are stronger, thinner, and lighter than copper wire cables, and they do not need to be maintained or replaced as frequently. Thus, fiber optics are known for their ability to transmit data rapidly and efficiently, making them a popular choice for various applications, including telecommunications, Internet connectivity, and networking. Moreover, fiber optics are highly versatile making them useful in various industries and applications beyond traditional IT and communication networks. For example, fiber optics may be found in the following industries: the medical field, aerospace technology, industrial sensing and monitoring, structural health monitoring, oil and gas industry, lighting and decoration, research and instrumentation, and even in the automotive industry.

Generally, a fiber optic cable consists of a few key components including a core made of glass or plastic that is designed to carry the light signals over long distances, cladding that allows the light signals to be reflected internally within the core-ensuring the light signals remain confined within the core and minimizing signal loss, buffer coating typically made of a polymer mater that provides physical protection to the delicate fiber optic components, various strength members such as aramid yarn or Kevlar to protect the cable from stretching or breaking and to provide tensile strength—each adding to the durability of the fiber optics, and an outer jacket that surrounds the entire cable and provides additional protection against environmental factors such as moisture, chemicals, and physical damage.

In today's digital age, fiber optic cables are particularly attractive to businesses as they allow for quick and uninterrupted telecommunication and Internet services. Thus, more companies are opting for fiber optic cables over traditional copper cables for their various communication and networking needs. With the preference for fiber growing, a need exists for a quick and easy way to install the fiber optic cable.

The last portion of the fiber optic cable that gets installed is generally referred to as fiber drop cable, drop cable, or fiber drop. The fiber drop is typically designed for the final connection between a distribution point, such as a local exchange or distribution cabinet, and an individual subscriber's premises, like a home or business. The fiber drop allows Internet service providers (ISPs) to extend high-speed broadband access to homes and businesses. Thus, fiber drop cables are crucial in delivering high-speed internet, television, and telephone services to individual customers, and they play a vital role in last-mile connectivity for fiber-optic networks. In general, fiber drop cables are typically smaller in diameter when compared to larger trunk or distribution cables. They are designed to be more manageable for the final connection to individual premises. The fiber drops also often contain a single optical fiber or a few fibers, as opposed to the multiple fibers found in larger cables. Because of their size and the fewer number of fibers, fiber drop cables are built to withstand environmental conditions, such as exposure to sunlight, moisture, and physical stress, as they are often installed outdoors and underground.

Presently, fiber cable drops are channeled through plastic conduit tubing that is usually buried underground between distribution points and end use points, with some of these conduits spanning distances between 100-400 feet. As the fiber drop is manually installed in the conduit—generally using a hand-over-hand technique that applies force or pushes the drop through the conduit until it reaches the exit point at the other end of the conduit—the drop may encounter one or more obstacles including depth changes, turns, kinks, splice points, and other obstacles. These obstacles and the manual nature of the installation require additional time, strength, and occasionally additional ISP technicians to complete the installation. This leads to longer install times, increased costs, and potentially customer dissatisfaction which may result in the customer canceling the fiber service request altogether.

Thus, a need exists for easier, faster, and more efficient installation fiber optics and fiber drops for the last few hundred feet of the fiber install.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In example embodiments, a fiber optic cable installation apparatus includes a housing, a first tube, a second tube, a pincher wheel, a drive wheel, and a drive shaft. The housing includes an upper housing portion and a lower housing portion. The housing further includes a first access point and a second access point. The first tube may be releasably coupled to the first access point and is configured for receiving a length of fiber optic cable. A second tube may be releasably coupled to the second access point, where the second tube is configured for receiving a length of existing conduit. The pincher wheel is encased within the upper housing portion and the drive wheel is encased within the lower housing portion. The drive shaft is fixedly coupled to the drive wheel and extends through an aperture in the lower housing portion. When a fiber optic cable is inserted into the first tube and pushed through into the housing into a position intermediate the pincher wheel and the drive shaft and a conduit is inserted into and secured to the second tube, the drive shaft may be rotated using any standard or traditional electric drill, thereby driving the drive wheel and causing the fiber optic cable to be pushed into and through the conduit.

In some embodiments, the first tube includes a slot extending from a first end of the first tube to a second end of the first tube.

3

In some embodiments, the second tube includes an elongated slot extending from a first end of the second tube to a second end of the second tube.

In some embodiments, a locking pin is operatively coupled to the second tube, where the locking pin is configured for securing the existing conduit within the second tube.

In particular embodiments, an adjustment knob is operatively coupled to the upper housing portion for adjusting the position of the pincher wheel with respect to the drive wheel.

In particular embodiments, the housing includes a slotted opening extending between the housing first access point and the housing second access point.

In some examples, the first tube includes a first exterior elongated slot, the second tube includes a second exterior elongated slot, and when the first tube and the second tube are rotated to align with each other and the housing slotted opening, this allows for installation of fiber optic cable at a mid-point on the fiber optic cable.

In some embodiments, the upper housing portion includes a first removable cover and the lower housing portion includes a second removable cover.

In various embodiments, the first tube and the second tube are interchangeable such that the first tube is also configured for releasably coupling to the second access point and the second tube is further configured for releasably coupling to the first access point.

According to example embodiments, a method is disclosed for using a fiber optic cable installation device by providing a fiber optic cable installation device that has a housing, a first tube, a second tube, a pincher wheel, a drive wheel, and a drive shaft. The housing includes an upper portion, a lower portion, a first entry point, and a second entry point. The housing upper portion includes an adjustment knob that is configured for adjusting the positon of the pincher wheel by rotating the adjustment knob clockwise or counterclockwise. Thus, the pincher wheel is operatively coupled to the housing upper portion while the drive wheel is operatively coupled to the housing lower portion. The first tube is releasably coupled to the first entry point and the second tube is releasably coupled to the second entry point. The second tube further includes a locking pin operatively coupled to the second tube. The drive shaft is fixedly coupled to the drive wheel and is configured for coupling to any standard power drill. When using the fiber optic cable installation device, the method further includes (1) inserting a fiber optic cable into the first tube and pushing it through the housing such that it is in contact with the drive wheel and the pincher wheel; (2) inserting a conduit into the second tube and securing the conduit to the second tube; (3) coupling an electric or power drill to the drive shaft; and (4) rotating the drive shaft using the drill, thereby rotating the drive wheel, causing the fiber optic cable to be pushed through the device and into the conduit.

In some embodiments, the conduit is secured to the second tube by rotating a locking pin operatively coupled to the second tube.

In particular embodiments, adjusting the adjustment knob to adjust the pincher wheel secures the fiber optic cable between the pincher wheel and the drive wheel by applying a downward pressure in the direction of the drive wheel on to the fiber optic cable.

According to example embodiments, a fiber optic cable installation device includes a housing having an upper portion, a lower portion, a first entry point, and a second entry point, where the upper portion also includes an adjustment knob. A first tube is releasably coupled to the first entry point and a second tube is releasably coupled to the second entry point. The second tube also includes a locking pin operatively coupled to the second tube for securing conduit to the second tube. A pincher wheel is operatively coupled to the housing upper portion and is adjustable closer to or further away from a drive wheel by an adjustment knob. A drive wheel is operatively coupled to the housing lower portion and a drive shaft is fixedly coupled to the drive wheel such that when the drive shaft is rotated, the drive wheel also rotates. In particular, the drive shaft is configured for receiving any suitable power or electric drill in order to drive/rotate the drive shaft, thereby power the drive wheel to rotate and push the fiber optic cable into and through the conduit.

In example embodiments, a modular optical cable installation apparatus is disclosed having a housing, a first tube, a second tube, a pincher wheel, and a drive wheel. In particular embodiments, the housing includes an upper housing portion and a lower housing portion. The housing further includes a first access point and a second access point. The first tube is configured for releasable coupling to either the first access point or the second access point. Similarly, the second tube is interchangeable with the first tube and is also configured for releasably coupling to either the first access point or the second access point, whichever access point is not coupled to the first tube. The pincher wheel may be enclosed within the housing proximate either the upper housing portion or the lower housing portion. Likewise, the drive wheel may be enclosed within the housing proximate the upper housing portion or the lower housing portion, whichever portion is not currently housing the pincher wheel. In example embodiments, a drive shaft is fixedly coupled to the drive wheel and extends through an aperture in the housing. The drive shaft allows a user to couple a power tool to the device to drive the drive wheel, thereby pushing or urging a fiber optic cable through the tool and into an existing conduit.

According to example embodiments, an optical fiber installation tool is disclosed that includes a housing that is configured to enclose a first wheel and a second wheel. The housing includes a first opening and a second opening. A first hollow tube is configured for coupling to at least one of the first opening and the second opening. A pressurized air source is configured for coupling to the other of the first opening or the second opening, whichever is not already coupled to the tube. The pressurized air source is configured to provide a cushion of air to help reduce friction as a fiber optic cable is pushed through the tube and driven through the housing by the first and second wheel in order to install the fiber optic cable into a conduit.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
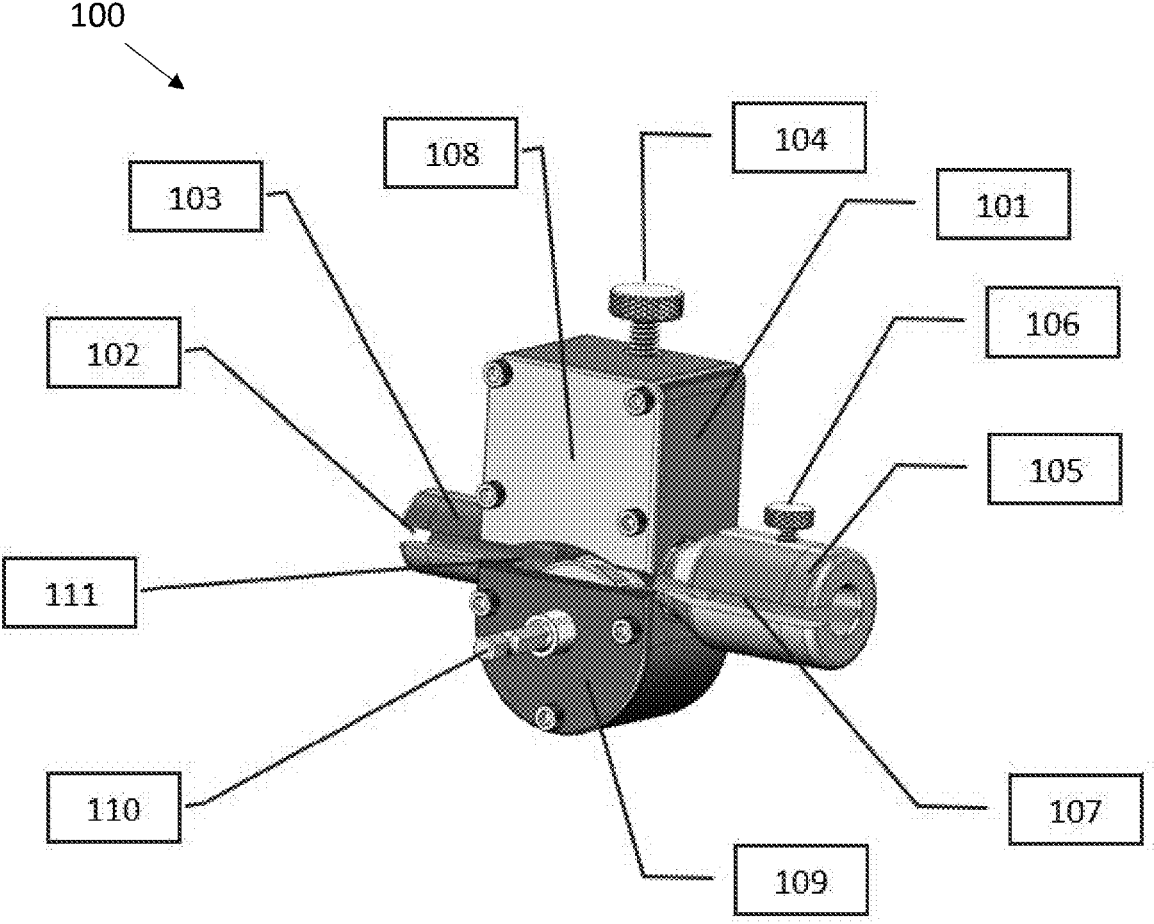
FIG. 1 is a perspective view of a universal installation tool for optical fiber, in accordance with an embodiment of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions. As used herein, the term "about," when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are within the scope of these descriptions.

Figure 2:
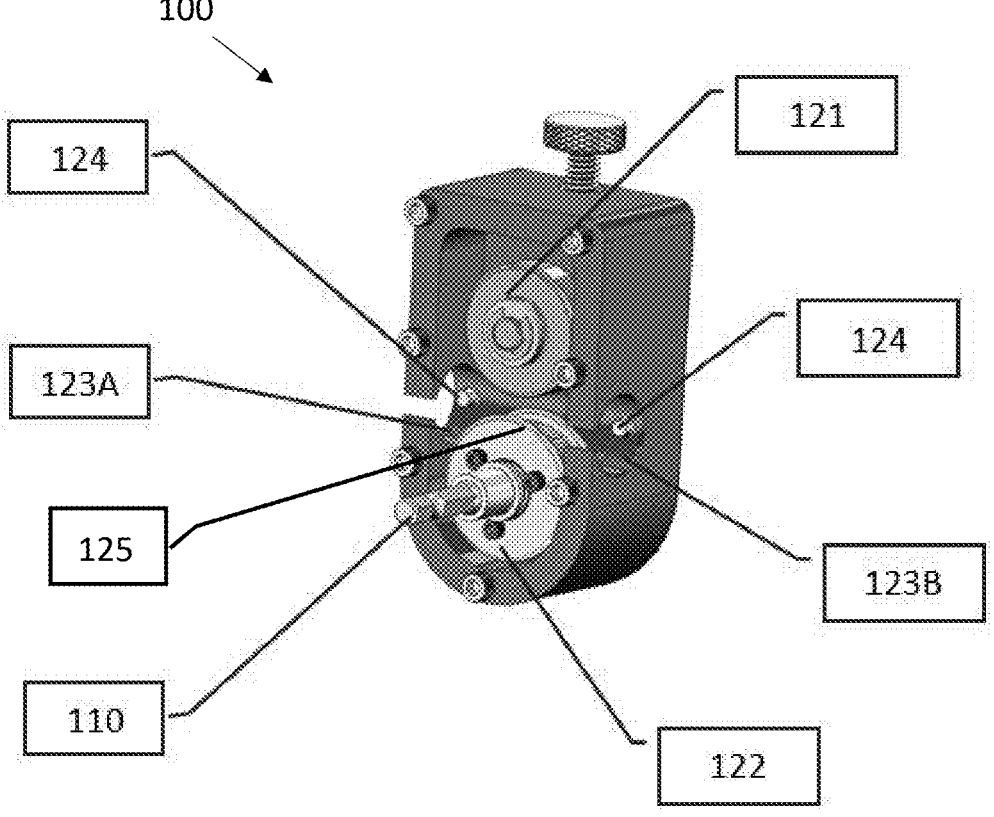
FIG. 2 is a perspective interior view of the universal installation tool for optical fiber of FIG. 1.
Figure 3:
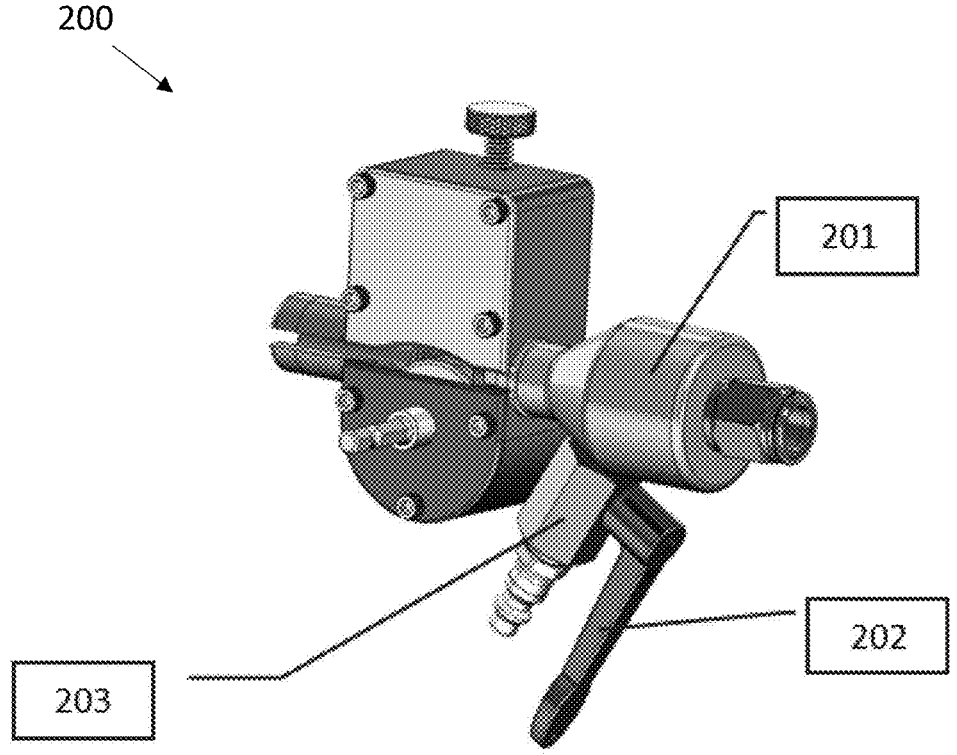
FIG. 3 is a perspective view of the universal installation tool for optical fiber of FIG. 1 having an air valve.

Referring to FIGS. 1-3, an optical fiber installation tool or device 100 provides a user with an easy and versatile/universal tool for installing optical fiber for any of a variety of uses, including, but not limited to, for telecommunication purposes. In particular, the optical fiber installation tool 100 is particularly beneficial for the installation of a fiber drop cable for the last few hundred(s) of feet of fiber that needs to be installed in telecommunications and broadband networks to provide service to a small amount of users, such as to a few residences, a small building, or to a small number of floors within a larger building.

The optical fiber installation tool 100 generally includes a body or housing 101 having one or more entry points 123A, 123B. In example embodiments, the optical fiber installation tool 100 is constructed of a substantially rigid and durable material such as metal. In some embodiments, the optical fiber installation tool 100 may be formed from a rigid plastic or other sturdy material. In some embodiments, one or more components may be formed of a first material, such as a corrosion resistant metal, and one or more other components may be formed from a second, less costly material to reduce the overall cost of the device 100. For example, certain components within the housing and that are not strained during the operation of the device may be constructed from less costly material.

In example embodiments, the device or apparatus 100 includes a first, or fiber entry/access point or tubing 103 is located on a first side of the housing and allows for the optical fiber to be threaded in to the optical fiber installation tool 100. In example embodiments, the fiber entry point 103 is generally cylindrical in shape with a cylindrical channel or slot 102 running through the entry point (i.e., an elongated slot exposing the interior channel to the exterior of the tube). Opposite the fiber entry point 103, on a second side of the housing is a conduit entry/access point or second tubing 105. Similarly, the conduit entry point 105 is generally cylindrical with a rounded or cylindrical channel/slot 107 running through it (i.e., an elongated slot exposing the interior channel to the exterior of the tube). In preferred embodiments, the fiber entry 103 and the conduit entry 105 align such that their axes are aligned with each other. In particular embodiments, the conduit entry 105 is has a larger inner and out diameter than the fiber entry 103 as the device 100 is intended to install the fiber such that it is encased by the conduit.

In further example embodiments, the conduit entry 105 includes a locking pin 106 that may be tightened or loosed to secure the conduit to the conduit tube 105. In example embodiments, the locking pin 106 is a screw that is secured within an aperture in the conduit tube 105. Although not shown, in various embodiments, the locking pin 106 includes one or more mechanisms that prevent the locking pin from being entirely removed from the conduit tube 105 to prevent losing the device.

In particular embodiments, although shown with a relatively short length as compared to the overall size of the apparatus 100, the entry point tubes 103, 105 may be any suitable length. However, the shorter length is preferred for installing the tool 100 close to the required entry point of the fiber cable into the conduit, in spite of the various hindrances or difficulties that may be encountered at the job site.

The apparatus 100, according to example embodiments, is modular allowing for one or more of the components of the apparatus to be interchangeable with each other or with alternate components. For example, in various embodiments, the entry point tubes 103, 105, while described in a particular configuration, are interchangeable with one another and are releasably coupled to the housing 101. Thus, in example embodiments, the coupling portion of the entry point tubes 103, 105 have generally the same dimensions to allow for interchangeability of the tubes such that they may be installed on either side of the housing depending upon various factors a user may encounter at the install site. In alternate embodiments, one or more couplings may be connected to the apparatus 100 to provide further modularity to the device by permitting tubes of different sizes to be coupled to the apparatus. In example embodiments, the couplings may be adjustable allowing for any size or shaped tube (or other accessory) to be easily coupled to the device. For example, the openings 123A, 123B may include an adjustable coupling for connecting tubing for conduits having varying diameters. In some embodiments, the entry point tubes 103, 105 include a threaded end for securing the tubes to the housing. In alternate embodiments, other coupling means or fasteners may be used including friction fit devices such as one or more detents, screws, snaps, and other mechanisms, including one such system as described with reference to FIG. 2.

Referring to FIG. 2, the housing 101 includes a first opening 123A and a second opening 123B for receiving either the fiber tube 103 or the conduit tube 105. Each opening 123A, 123B includes a locating pin 124 that permit easier install of the tubes 103, 105 by aligning the slot 102, 107 of each respective tube with the locating pin 124 for coupling and decoupling the tubes from the housing 101. Thus, as shown in FIGS. 1 and 2, the fiber tube 103 slot 102 may be aligned with the locating pin 124 proximate the first opening 123A and then the tube may be rotated to secure the tube to the housing. Likewise, the conduit tube 105 slot 107 may be aligned with the locating pin 124 proximate the second opening 123B and then the tube may be rotated to secure the tube to the housing. As discussed above, each of the tubes may be interchangeably installed at either opening 123A, 123B.

According to various embodiments, as shown in FIGS. 1-2, the housing or body 101 of the device 100 includes a first cover or plate 108 and a second cover or plate 109. The covers 108, 109 may be removably coupled to the housing (for example with removable screws) to allow access to the internal components for any potential replacement, reconfiguration, and/or repair of the components housed within the body 101 that may be necessary. Any suitable fastener may be used to releasably couple the covers 108, 109 to the body 101. In example embodiments, one such internal component, a drive shaft 110 (as discussed in more detail below), extends through an aperture in the second plate 109. Additionally, an opening or slit 111 extends from the first side of the housing 123A to the second side of the housing 123B, leaving a gap or opening between the first and second plates 108, 109. This opening or slotted opening 111 is specifically designed such that when the tubed entry points 103, 105 are rotated, their respective slots 103, 107 may be aligned with the opening 111 to permit an uninterrupted and continuous sized opening in the tool from the first side 123A to the second side 123B.

Referring again to FIG. 2, the tool 100 includes various internal components including a pincher wheel 121, a drive wheel 122, and a drive shaft 110 extending from, and fixedly coupled to, the drive wheel. The pincher wheel is located within the body 101 proximate and behind the first plate 108. The pincher wheel 121 is located above the drive wheel 122 such that their axes of rotation are parallel to each other and aligned with the sides of the body 101. In some embodiments, the location of the pincher wheel 121 and the drive wheel 122 are interchangeable with each other, allowing for the apparatus to be modularly configured and suited for any and all job sites. Extending out of an aperture in an upper surface of the body 101 is an adjustment knob 104 for adjusting the pincher wheel 121 up and down with respect to the drive wheel 122. In example embodiments, the adjustment knob 104 is a threaded knob that may be rotated to move the axis of the pincher wheel 121 up or down, such that the tread of the pincher wheel can come into contact with the tread of the drive wheel. Similar to the conduit entry 105 locking pin 106, the adjustment knob 104 is preferably only able to be adjusted up and down but is not permitted to be removed from the housing to prevent unintentional loss of the component. Although generally described as a traditional pincher wheel, any other suitable mechanism may be used to help retain the fiber and conduit within the tool and to assist with threading the fiber through the conduit. For example, a clamp or other mechanical grip may be used in lieu of a pincher wheel. In some embodiments, certain features including various materials, tread geometry, perimetry geometry, diameter of the pincher wheel, and width of the pincher wheel may be adjusted to accommodate to specific job requirements.

Referring still to FIG. 2, in some embodiments, the draft shaft 110 may be permanently or semi-permanently coupled to the drive wheel 122 so that the two components rotate as a single component about a fixed rotation point with respect to the body 101. In example embodiments, the drive wheel 122 includes a toothed outer circumference 125 to prevent or limit the slippage of the fiber as the fiber is threaded through the conduit. In some embodiments, the drive wheel 122 outer circumference may also include raised rim or ridge (not numbered) to keep the fiber from slipping off the drive wheel. Additional other features to prevent or limit slippage include the type of material the drive wheel is constructed from, the tread geometry, the perimeter geometry, the diameter of the drive wheel, the width the of the drive wheel, etc.

In use, the optical fiber installation device 100 is used to help with pushing fiber optic cables through a conduit that has already been installed at a particular location. One end of the conduit is inserted into the conduit tube entry point 105 and then secured in place with the locking pin 106. Because the tubes 103 and 105 may be interchangeably coupled to the housing 101, the device may be oriented in any preferred direction to optimize use of the device based on varying environmental elements.

Once the existing conduit has been secured to the device 100, the fiber optics that are intended to be installed at the worksite and into the conduit may then be inserted into the fiber tube entry point 103 and pushed through the device such that the fiber optic cable is positioned between the pincher wheel 121 and the drive wheel 122. Prior to this, a user should confirm that the space between the pincher wheel 121 and the drive wheel 122 is sufficient for receiving the selected fiber optic cable by increasing or decreasing the distance between the two wheels 121, 122 using the knob 104. Once the fiber optic cable has been inserted into the device 100 in an amount sufficient to begin using the device to thread the cable into the conduit, the pincher wheel 121 is moved into the correct position to increase the pressure on the cable based on its location between the wheels.

Once the conduit and the fiber cable have been placed in to their appropriate positions, any suitable drill may be coupled to the drive shaft 110 to operate the device 100. For example, once the drill is secured to the drive shaft 110, the drill rotates the drive shaft, thereby rotating the drive wheel 122, which drives the fiber optic cable into the conduit. If slippage occurs between the fiber optic cable and the wheels, the knob 104 may be adjusted to tighten the pressure to prevent further slippage.

In some instances, the fiber optic cable that needs to be installed into a conduit may not have an access end as both ends of the cable are already connected and providing service, for example. In this case, the slots 102, 107 at the entry points 103, 105 are each aligned with the housing opening 111. This creates an opening that will allow the fiber optic cable to be inserted into the device at a mid-point or mid-span along the fiber optic cable.

In an alternate embodiment, as shown in FIG. 3, an optical fiber installation tool 200 includes one or more additional accessories such as an air blower device. For example, an air blow adapter 201 may be coupled to the installation tool in lieu of the conduit entry point 105. The air blow adapter 201 includes a pressurized air connector 203 and an air valve 202. The air blow adapter 201 is sized and shaped such that it is compatible with either side opening 123A, 123B of the housing 101, as described above, adding to the modularity of the device. Thus, the air blow adapter 201 may be installed or coupled to the housing 101 openings 123A, 123B without any other modifications to the tool 100, housing 101, or to either of the two side openings.

In example embodiments, the air blow adapter 201 provides a cushion of air into the conduit. A pressurized air source can be coupled to the device 200 through the air connector 203 to accomplish this task. The cushion of air helps push the fiber optic cable through the conduit, while also decreasing the friction between the fiber optic cable and the existing conduit. The valve 202 may be used to adjust the amount of air pressure being used.

The optical fiber installation tool 100 and the alternate embodiment device 200 provide advantages over the prior art because they allow for fiber optic cable to be installed into conduit much faster and more reliably through the use of a drill or other power tool. This eliminates any technician delay or fatigue because the installation is not manual, and minimizes user error. A further advantage is that the device 100, 200 reduces the amount of time it takes to complete the installation, which allows the technician to complete more jobs during their shift than they would have previously been able to complete. Additionally, as the device 100 may be fitted to any suitable power tool or drill, the device has a universal application, thereby reducing the number of tools required and reducing the investment necessary to complete the install.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A fiber optic cable installation apparatus, the apparatus comprising:
   a housing, wherein the housing comprises an upper housing portion and a lower housing portion, and wherein the housing comprises a first access point and a second access point;
   a first tube configured for receiving a length of fiber optic cable, wherein the first tube is configured for releasably coupling to the first access point;
   a second tube configured for receiving a length of existing conduit, wherein the second tube is configured for releasably coupling to the second access point, and wherein the second tube comprises a slot extending from a first end of the second tube to a second end of the second tube;
   a pincher wheel encased within the upper housing portion;
   a drive wheel encased within the lower housing portion; and a drive shaft fixedly coupled to the drive wheel and extending through an aperture in the lower housing portion,
   wherein, in use, a fiber optic cable is inserted into the first tube to a position intermediate the pincher wheel and drive wheel, a conduit is inserted into and secured to the second tube, and the drive shaft is rotated, thereby driving the drive wheel causing the fiber optic cable to be pushed through the conduit.

2. The fiber optic cable installation apparatus of claim 1, wherein the first tube comprises a slot extending from a first end of the first tube to a second end of the first tube.

3. The fiber optic cable installation apparatus of claim 1, wherein a locking pin is operatively coupled to the second tube, wherein the locking pin is configured for securing a conduit within the second tube.

4. The fiber optic cable installation apparatus of claim 1, wherein an adjustment knob is operatively coupled to the upper housing portion for adjusting the position of the pincher wheel with respect to the drive wheel.

5. The fiber optic cable installation apparatus of claim 1, wherein the housing comprises a slotted opening extending between the first access point and the second access point.

6. The fiber optic cable installation apparatus of claim 5, wherein the first tube comprises a first exterior elongated slot, wherein the first tube and the second tube are configured to rotate to align the first exterior elongated slot, the slot of the second tube, and the slotted opening of the housing for allowing installation of fiber optic cable at a mid-point on the fiber optic cable.

7. The fiber optic cable installation apparatus of claim 1, wherein the upper housing portion comprises a first removable cover, and wherein the lower housing portion comprises a second removable cover.

8. The fiber optic cable installation apparatus of claim 1, wherein the first tube and the second tube are interchangeable such that the first tube is configured for releasably coupling to the second access point, and wherein the second tube is configured for releasably coupling to the first access point.

9. A method of using a fiber optic cable installation device, the method comprising:
   providing a fiber optic cable installation device, wherein the fiber optic cable installation device comprises:
      a housing having an upper portion, a lower portion, a first entry point, and a second entry point, wherein the upper portion comprises an adjustment knob;
      a first tube releasably coupled to the first entry point;
      a second tube releasably coupled to the second entry point, the second tube comprising a locking pin operatively coupled to the second tube;
      a pincher wheel operatively coupled to the housing upper portion, wherein the pincher wheel position is adjustable by rotating the adjustment knob;
      a drive wheel operatively coupled to the housing lower portion; and
      a drive shaft fixedly coupled to the drive wheel, wherein the drive shaft is configured for use with an electric drill;
   inserting a fiber optic cable into the first tube;
   inserting a conduit into the second tube;
   coupling an electric drill to the drive shaft; and
   rotating the drive shaft using the electric drill, thereby rotating the drive wheel, and thereby pushing the fiber optic cable through the conduit.

10. The method of claim 9, the method further comprising securing the conduit to the second tube by rotating the locking pin operatively coupled to the second tube.

11. The method of claim 10, the method further comprising adjusting the adjustment knob to adjust the position of the pincher wheel to secure the fiber optic cable between the pincher wheel and the drive wheel.

12. The method of claim 9, wherein the housing comprises a slotted opening extending between the first entry point and the second entry point, wherein the first tube comprises a first exterior elongated slot, wherein the second tube comprises a second exterior elongated slot, wherein the first tube and the second tube are configured to rotate to align the first exterior elongated slot, the second exterior elongated slot, and the housing slotted opening for allowing installation of fiber optic cable through an existing conduit at a mid-span of the fiber optic cable.

13. The method of claim 9, wherein the housing upper portion comprises a first removable cover.

14. The method of claim 9, wherein the housing lower portion comprises a second removable cover.

15. A fiber optic cable installation device, the device comprising:
  a housing having an upper portion, a lower portion, a first entry point, and a second entry point, wherein the upper portion comprises an adjustment knob;
  a first tube releasably coupled to the first entry point;
  a second tube releasably coupled to the second entry point, the second tube comprising a locking pin operatively coupled to the second tube;
  a pincher wheel operatively coupled to the housing upper portion, wherein the pincher wheel position is adjustable by rotating the adjustment knob;
  a drive wheel operatively coupled to the housing lower portion; and
  a drive shaft fixedly coupled to the drive wheel, wherein the drive shaft is configured for coupling to an electric drill.

16. The device of claim 15, wherein the adjustment knob is configured to adjust the position of the pincher wheel up or down to secure a fiber optic cable inserted into the first tube and positioned intermediate the pincher wheel and the drive wheel.

17. The device of claim 15, wherein the locking pin is configured to secure a conduit inserted into the second tube.

18. The device of claim 15, wherein the housing upper portion comprises a first removable plate, and wherein the housing lower portion comprises a second removable plate.

19. The device of claim 18, wherein the drive shaft extends out of the housing, through an aperture in the second removable plate.

20. A modular optical cable installation apparatus, the apparatus comprising:
  a housing, wherein the housing comprises an upper housing portion and a lower housing portion, and wherein the housing comprises a first access point and a second access point;
  a tube configured for releasably coupling to at least one of the first access point and the second access point, the tube comprising a slot extending from a first end of the tube to a second end of the tube;
  a pincher wheel enclosed within the housing proximate to at least one of the upper housing portion and the lower housing portion;
  a drive wheel enclosed within the housing proximate to at least one of the upper housing portion and the lower housing portion; and
  a drive shaft fixedly coupled to the drive wheel and extending through an aperture in the housing.

21. The apparatus of claim 20, wherein the tube is releasably coupled to the second access point, the pincher wheel is enclosed within the housing proximate the upper housing portion, and the drive wheel is enclosed within the housing proximate the lower housing portion.

22. The apparatus of claim 20, wherein the pincher wheel is enclosed within the housing proximate the lower housing portion, and the drive wheel is enclosed within the housing proximate the upper housing portion.

23. An optical fiber installation tool, the installation tool comprising:
  a housing enclosing a first wheel and a second wheel configured to push an optical fiber through the housing, wherein the housing includes a first opening and a second opening for receiving the optical fiber;
  a tube configured for coupling to at least one of the first opening and the second opening, the tube comprising a slot for receiving the optical fiber, the slot extending from a first end of the tube to a second end of the tube; and
  a pressurized air source configured for coupling to at least one of the first opening and the second opening, wherein the pressurized air source is configured to provide a cushion of air to help reduce friction while using the installation tool to install the optical fiber into a conduit.

* * * * *